United States Patent
Holder et al.

(10) Patent No.: US 6,647,526 B1
(45) Date of Patent: Nov. 11, 2003

(54) MODULAR/RE-CONFIGURABLE TEST PLATFORM

(75) Inventors: Michael Holder, Chesterland, OH (US); James Wojcik, Parma, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 532 days.

(21) Appl. No.: 09/609,556

(22) Filed: Jun. 30, 2000

(51) Int. Cl.[7] .......................... G01R 31/28; G06F 11/00
(52) U.S. Cl. ...................... 714/743; 714/724; 714/732; 714/32; 714/37; 702/118; 702/121; 324/73.1; 324/158.1; 324/754; 324/765
(58) Field of Search .................... 714/743, 27, 732, 714/736, 734, 737, 738, 37, 724, 32; 324/73.1, 158.1, 754, 765; 702/121, 118

(56) References Cited

U.S. PATENT DOCUMENTS

| | | | |
|---|---|---|---|
| 3,854,125 A | * 12/1974 | Ehling et al. | ................. 714/27 |
| 5,036,479 A | * 7/1991 | Prednis et al. | .............. 702/121 |
| 5,402,079 A | 3/1995 | Levy | .......................... 324/765 |
| 5,828,223 A | 10/1998 | Rabkin et al. | .............. 324/754 |

* cited by examiner

Primary Examiner—Emmanuel L. Moise
(74) Attorney, Agent, or Firm—Amin & Turocy, LLP; Alexander M. Gerasimow; William R. Walburn

(57) ABSTRACT

A system and method is provided for testing industrial control modules. Input and output stimulus signals, communication lines, measurement device lines and relay contacts are provided at a tester interface panel. This allows for a test developer to configure the relay contacts in any way that the developer desires to provide appropriate connections of stimulus, communications and measurements for a given industrial control module. The switching of the relays between a normally closed position and a normally open position can be controlled by output modules coupled to a computer. The relays can be insertable and releasable in a socket for easy fault isolation and replacement. Furthermore, the same relays or similar relays can be employed for both low current measurements and high power stimulus.

34 Claims, 12 Drawing Sheets

MODULAR/RE-CONFIGURABLE TEST PLATFORM

TECHNICAL FIELD

The present invention generally relates to industrial control systems and in particular to a system and method for testing the functionality of industrial control modules.

BACKGROUND OF THE INVENTION

Industrial controllers are special purpose computers used for controlling factory automation devices. Under the direction of a stored program, a processor of the industrial controller examines a series of inputs reflecting the status of a controlled processor or device and changes outputs affecting control of the controlled process or device. The inputs and outputs may be of an analog or digital nature. Generally industrial controllers are constructed in modular fashion to accommodate different application requiring different numbers and types of input/output (I/O) circuits as is determined by the particular device or process being controlled. In such modular systems, a number of different functional modules connect together through a common backplane in a rack to share data and power. However, other types of modules forming industrial controller solutions include communication modules adapted to provide communication links, counter/encoder modules for monitoring motor position information, programming modules adapted to be programmable to function according to a user's instructions, relay modules typically provided to shut off automated devices and control modules adapted to control and operate industrial control modules.

Prior to the introduction of industrial control modules into a factory environment, the modules are tested by a test system to verify the proper operation and functionality of the industrial control module. Typical test systems employed to test industrial control modules suffer from several deficiencies. For example, high current type relays are employed for coupling the modules to input and output stimulus devices to verify the operation of independent inputs and outputs of the industrial control modules. Furthermore, low current low resistance relays are employed to couple measurement instruments to these devices to measure the outputs of the industrial control modules. typically, the high current relays are disposed on a relay board with one end of each relay coupled to a backplane. The backplane is then coupled to the input and output stimulus devices through additional relays. The other end of the relay is provided for coupling to the industrial control module input and output signals. If one of the relays fail, the entire relay board must be repaired or replaced. The exact relay that has failed on the relay board is very difficult to determine and board replacement and repair is very expensive.

The low current relays are also disposed on a relay board with one end of each relay coupled to a backplane. The backplane is then coupled to the measurement instruments through additional relays. The other end of the relay is provided for coupling to the industrial control module input and output signals. In addition to having the aforementioned repair problems, the low current relays are subjected to measurement errors for low voltage signals during signal measurements due to the additional resistance of the wiring and the relays from the instruments to the backplane, from the backplane to the relays and from the relays to the units under test. An adjustment factor found by trial and error is typically added to the allowable device limits to compensate for the additional resistance. However, due to wear in the relay contacts from time and development errors this adjustment factor may change over time. The result is production failures, which requires additional production and engineering manpower costs.

The conventional test systems utilized for testing industrial control modules sometimes employ an electronic load to simulate current drawing systems that the industrial control module will drive. Therefore, the electronic load is coupled and decoupled to each output of the industrial control module one at a time and then measured using an appropriate measurement device for both low current and high current testing. After the electronic load is coupled to an output, the load will need to stabilize before it can be measured. This constant moving and stabilizing of the electronic load is time consuming and limits the ability of the industrial control module to be completely tested at a reasonable test time.

Therefore, it is apparent that there is an unmet need for a test system and method that mitigates the aforementioned deficiencies.

SUMMARY OF THE INVENTION

The present invention provides for a system and method for testing industrial control modules. Input and output stimulus signals, communication lines, measurement device lines and relay contacts are provided at a tester interface panel. This allows for a test developer to configure the relay contacts in any way that the developer desires to provide appropriate connections of stimulus, communications and measurements for a given industrial control module. The switching of the relays between a normally closed position and a normally open position can be controlled by output modules coupled to a computer. Preferably, the relays are insertable and releasable in a socket for easy fault isolation and replacement. Furthermore, the same relays or similar relays can be employed for both low current measurements and high power stimulus.

In one aspect of the invention, a test fixture is provided for interfacing with the tester interface panel and a unit under test. The test fixture provides mechanical and electrical connections to a family of industrial control modules. A personality module is also provided that is coupleable to the test fixture and provides mechanical and electrical connections to different industrial control modules of a family of industrial control modules. This allows for utilization of a single fixture for testing a family of industrial control modules with a much simpler and less expensive personality module being provided for each industrial control module type.

One particular aspect of the invention relates to a system for testing industrial control modules having at least one input. The system comprises a tester interface panel and an input stimulus device coupled to the tester interface panel. The input stimulus device is adapted to provide at least one input stimulus signal. At least one relay is provided and includes a normally open contact, a common contact, and a normally closed contact coupled to the tester interface panel. The at least one relay is configurable to couple the at least one input stimulus signal to the at least one input.

Another aspect of the present invention relates to a system for testing industrial control modules having at least one output signal. The system comprises a tester interface panel and a measurement instrument coupled to the tester interface panel. The measurement instrument is adapted to measure the at least one output signal. An electronic load device is also provided. Additionally, at least one power relay is provided including a normally open contact, a common contact, and a normally closed contact coupled to the tester interface panel. At least one analog relay including a normally open contact, a common contact, and a normally closed contact is also coupled to the tester interface panel. The at least one power relay is configurable to couple the electronic load to the at least one output signal and the at least one analog relay is configurable to couple the measurement instrument to the at least one output signal.

Another aspect of the present invention relates to a system for testing industrial control modules having at least one of a plurality of inputs and a plurality of outputs. The system comprises a tester interface panel and an input stimulus device, an electronic load and a measurement instrument all coupled to the tester interface panel. The input stimulus device is adapted to provide a plurality of input stimulus signals and the measurement instrument is adapted to measure the at least one of a plurality of inputs and a plurality of outputs. A plurality of power relays are provided with each including a normally open contact, a common contact, and a normally closed contact coupled to the tester interface panel. A plurality of analog relays are also provided with each including a normally open contact, a common contact, and a normally closed contact coupled to the tester interface panel. Any of the plurality of power relays are configurable to couple one of the electronic load and any of the plurality of input stimulus signals to any of the at least one of a plurality of inputs and a plurality of outputs and any of the plurality of analog relays are configurable to couple the measurement instrument to any of the at least one of a plurality of inputs and a plurality of outputs.

Yet another aspect of the present invention relates to a method for testing industrial control modules having at least one of an input and an output. The method comprises the steps of providing a tester interface panel, coupling input stimulus signals, output stimulus signals, measurement instrument lines and relay contacts to the tester interface panel where the relay contacts including a normally open contact, a common contact, and a normally closed contact for each relay coupled to the tester interface panel. The method also includes the steps of configuring at least one relay of the each relay coupled to the tester interface panel, so that at least one of the input stimulus signals, output stimulus signals and measurement instrument lines are coupleable to the at least one of an input and an output. A control system is provided for moving the at least one relay between a normally closed state and a normally open state for coupling the at least one of the input stimulus signals, output stimulus signals and measurement instrument lines to the at least one of an input and an output.

Still yet another aspect of the present invention relates to a system for testing industrial control modules having at least one of an input and an output. The system comprises means for providing accessibility to input stimulus signals, output stimulus signals, measurement instrument lines and relay contacts where the relay contacts include a normally open contact, a common contact, and a normally closed contact for each relay. The system further comprises means for configuring at least one relay of the each relay, so that at least one of the input stimulus signals, output stimulus signals and measurement instrument lines are coupleable to the at least one of an input and an output. The system also includes means for moving the at least one relay between a normally closed state and a normally open state for coupling the at least one of the input stimulus signals, output stimulus signals and measurement instrument lines to the at least one of an input and an output.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will now be described with reference to the drawings. The present invention will be described with reference to a system and method for testing industrial control modules. The present invention provides for a system and method for testing industrial control modules. Input and output stimulus signals, communication lines, measurement device lines and relay contacts are provided at a tester interface panel providing configurability of any of the available resources for test development. It should be understood that the description of the various aspects of the present invention are merely illustrative and that they should not be taken in a limiting sense.

Figure 1:
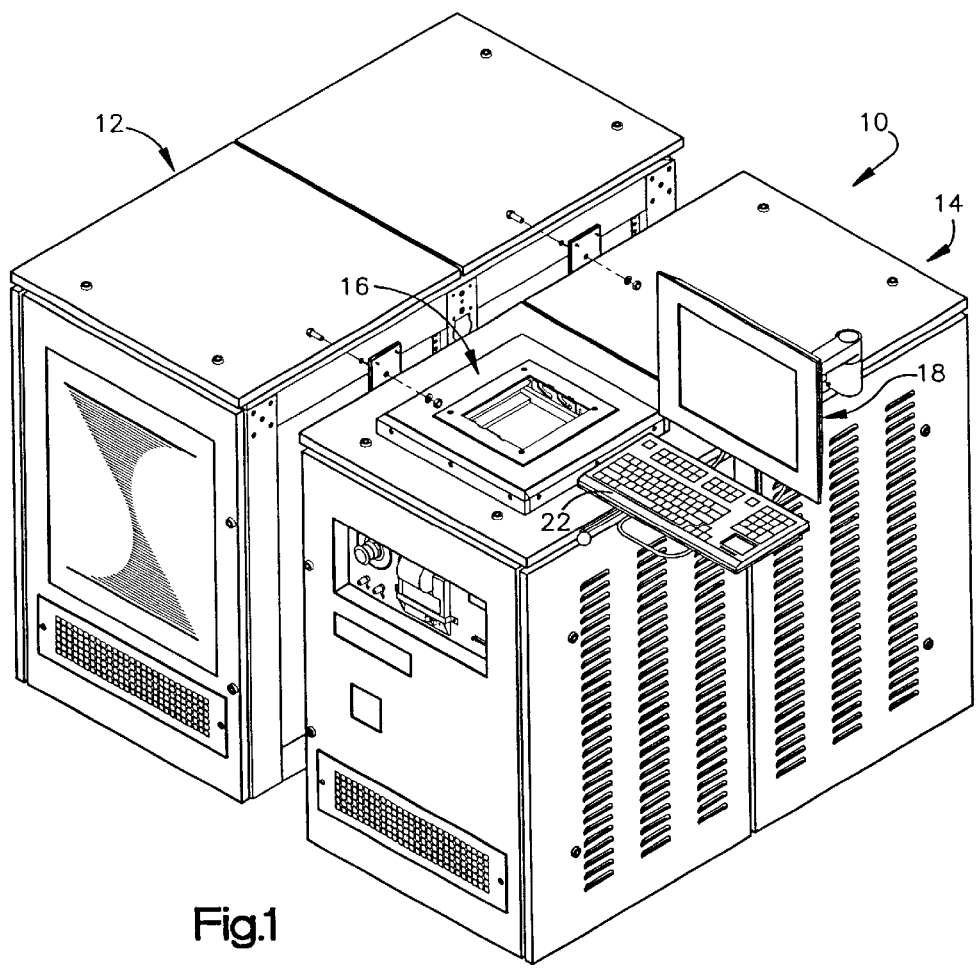
FIG. 1 illustrates a perspective view of a test system in accordance with one aspect of the present invention.

FIG. 1 illustrates a test system 10 having an instrument bay 12 and a test bay 14. A tester interface panel 16 resides on top of the test bay 14. The tester interface panel 16 is adapted to receive and mate with a test fixture interface panel for testing industrial control modules of various product families and product types having different functional capabilities. A computer display 18 and a computer keyboard 22 are coupled to the test bay 14 and provide user interface capabilities to the test system 10.

Figure 2:
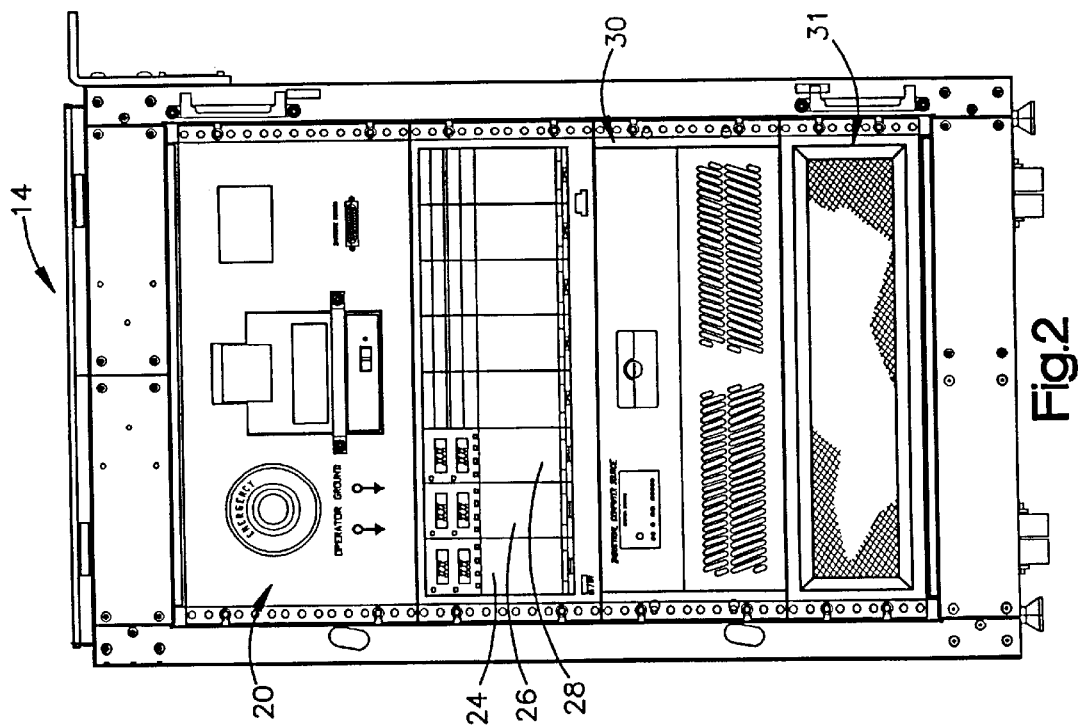
FIG. 2 illustrates a front view of a test bay of the test system of FIG. 1 in accordance with one aspect of the present invention.

FIG. 2 provides a more detailed description of the test bay 14. The test bay 14 includes an operator panel 20. The operator panel 20 includes components such as an emergency stop button, a printer, a barcode reader port, an operator connection and a ground connection. It is to be appreciated that various other operator interface components can be provided on the operator panel 20. The test bay 14 also includes DC power supplies 24, 26 and 28. The DC power supplies 24, 26 and 28 provide power for powering up industrial control modules under test (hereinafter referred to as unit under test (UUT). The DC power supplies can also provide DC power for UUTs that utilize DC voltage as an input signal (e.g., DC input modules). The test bay 14 also includes a computer 30 coupled to the display 18 and the keyboard 22. The computer 30 can be programmed to provide a variety of different communication protocols utilized in testing different UUTs (e.g., RS-232, DeviceNet, ControlNet, RIO, USB). A blower 31 is provided in the test bay 14 to ensure that components within the test bay 14 remain cool during operation of the test system 10.

Figure 3:
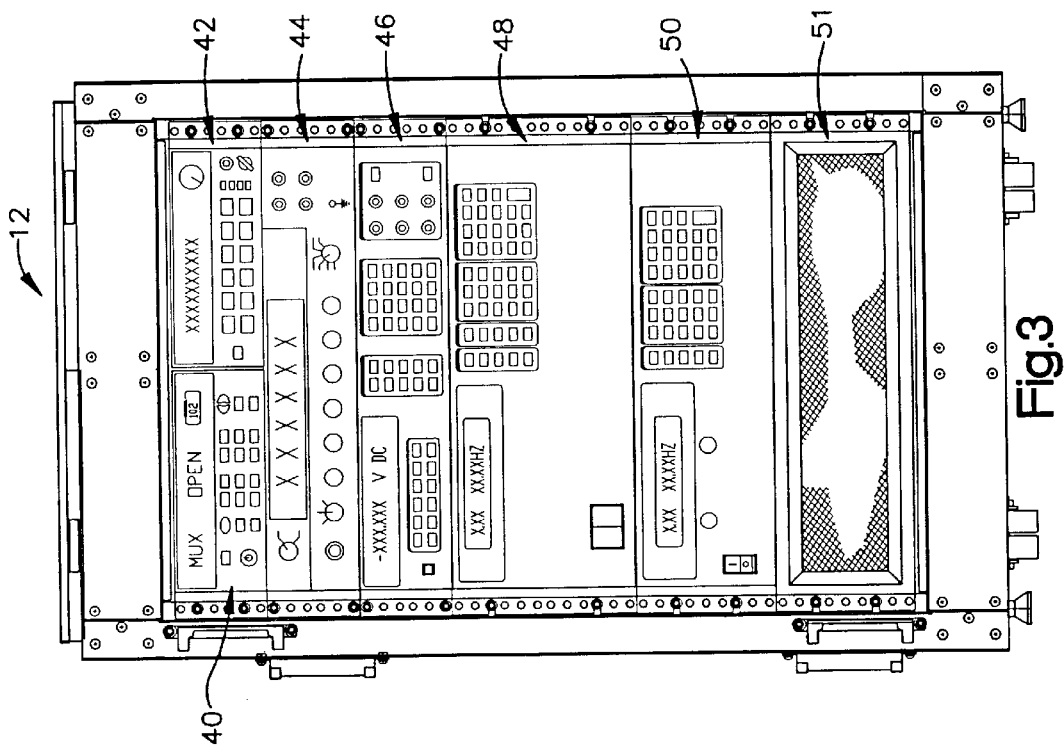
FIG. 3 illustrates a front view of an instrument bay of the test system of FIG. 1 in accordance with one aspect of the present invention.

FIG. 3 provides a more detailed description of the instrument bay 12. The instrument bay 12 includes instruments that provide measurements of UUT characteristics and parameters having a variety of differing functionalities. The instruments also provide input and output stimulus similar to the stimulus that the UUT will experience in its normal operational environment. The instrument bay 12 houses a data acquisition system (DAQ) 40, a waveform generator 42, a DC voltage calibration/simulator 44, a digital multimeter 46, an electronic load 48 and an AC power supply 50. A blower 51 is provided in the instrument bay 12 to ensure that the instruments within the instrument bay 12 remain cool during operation of the test system 10.

Figure 4:
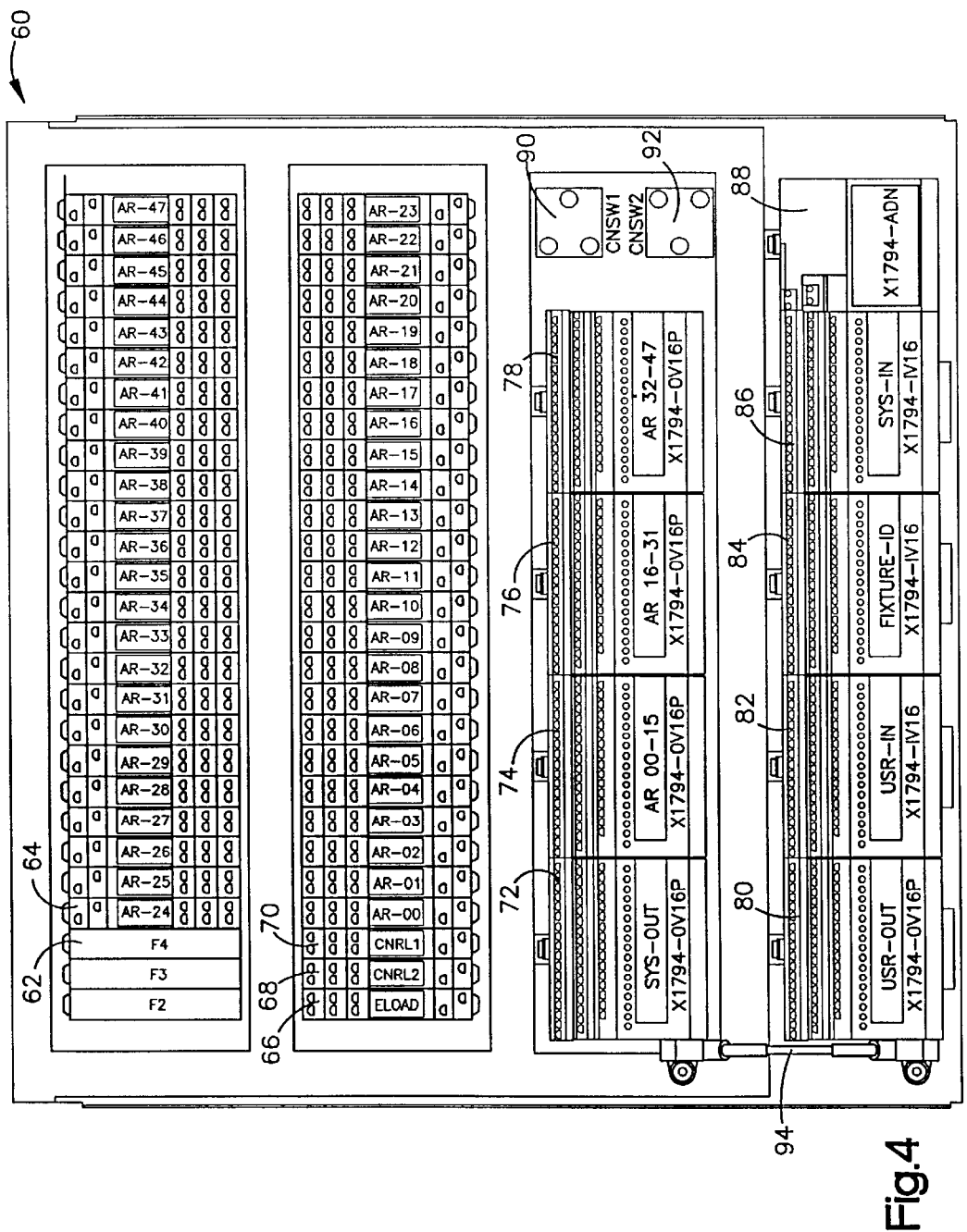
FIG. 4 illustrates a plan view of a first relay system in accordance with one aspect of the present invention.

FIG. 4 illustrates a first relay system 60 provided within the test system 10. The first relay system 60 includes a plurality of fuses 62 and relays 64, 66, 68 and 70. Relay 66 is provided to connect and disconnect the electronic load 48 from the tester interface panel 16. The relays 68 and 70 control the availability of ControlNet communication lines at switches 90 and 92. Fuses 62 provide the test system 10 with overcurrent protection. Each relay 64 is referred to as an analog relay (AR). Analog relays 64 are utilized in performing low current measurements of signals of UUTs. The analog relays are configurable to provide the measurement instruments (e.g., multimeter 46) with accurate low current signals. The relays 64 are provided with low resistance double gold contacts for accurate low current signals. An example of such a relay is an Allen Bradley Relay Catalog Number 700-HKX2Z24, which is a double pole double throw relay. Output modules 74, 76 and 78 are provided to control the switching of relays 64. A system output module 72 and a system input module provides input and output signals for testing and/or calibration of the test system 10. A user output module 80 and a user input module 82 provide a test developer with available output and input signals for use in testing of the UUTs. A fixture ID module 84 is provided to read an identification number associated with the test fixture being employed to test the UWT. A communication module 88 provides a communication link for all the above input and output modules. The communication module 88 can be coupled to the computer 30. The computer 30 can be programmed to communicate to the communication module 88.

Figure 5:
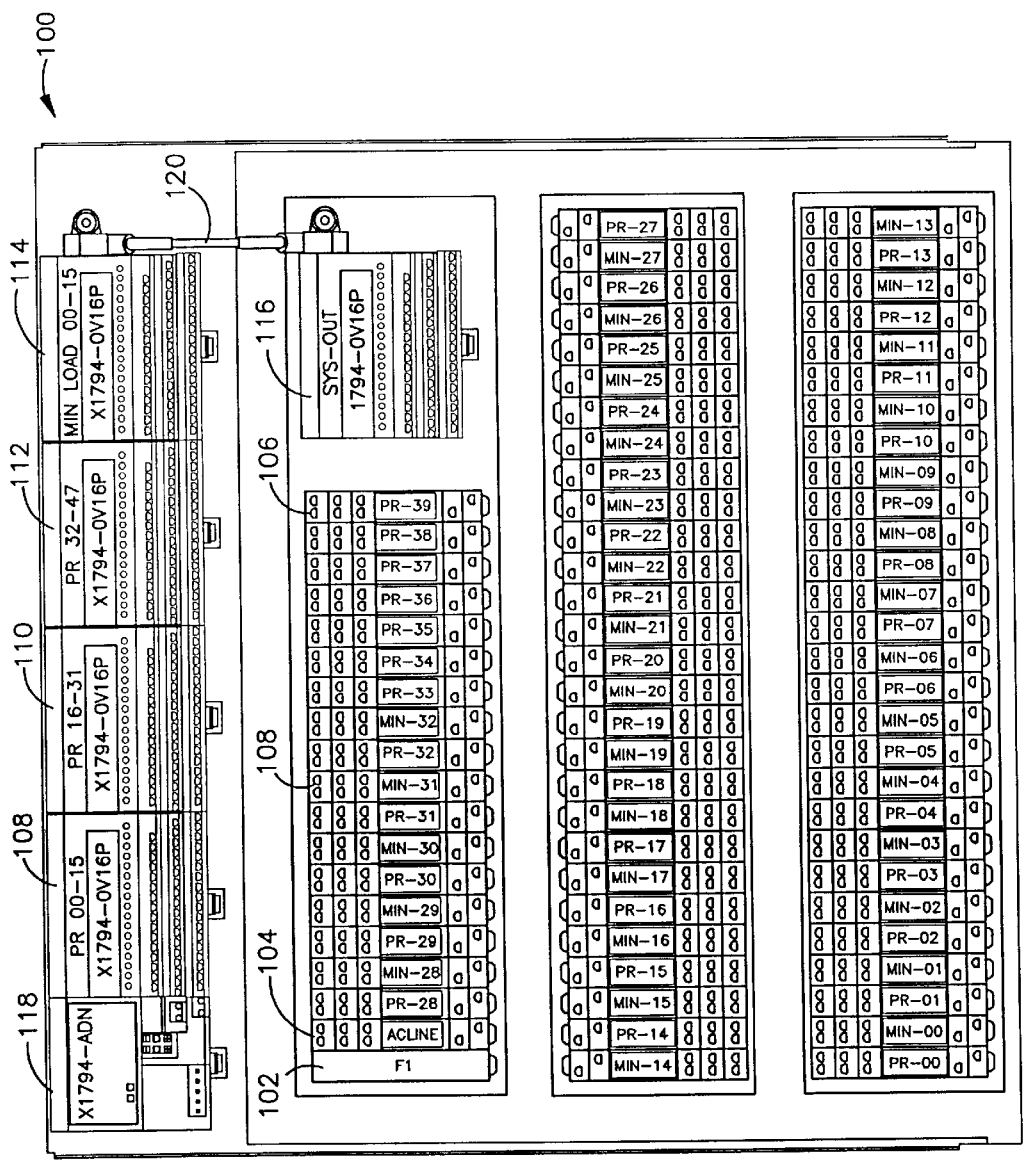
FIG. 5 illustrates a plan view of a second relay system in accordance with one aspect of the present invention.

FIG. 5 illustrates a second relay system 100 provided within the test system 10. The second relay system 100 includes a fuse 102 and relays 104, 106 and 108. Fuses 102 provides test system 10 with overcurrent protection. Relay 104 is employed to decouple an AC input line from the tester interface panel 16. Each relay 108 is referred to as a minimum current relay (MIN) and is employed for leakage current testing of control module signals (e.g., output modules) to determine the existence of any short between different signals on the control module. Each relay 106 is referred to as a power relay (PR). Power relays 106 provide higher current signals to and from UUTs. For example, the power relays 106 are configurable to provide power supply input signals to input modules and the coupling of the load to signals of output modules. Output modules 108, 110 and 112 are provided to control the switching of power relays 106. Output modules 114 and 116 are provided to control the switching of minimum current relays 108. An example of a control module family that may be employed to operate the relays and other functions in the test system 10 is known as the Flex-IO (catalog no. x1794) system of industrial controllers manufactured by Rockwell Automation.

The relays 104, 106 and 108 can be provided with similar or the same relays as utilized in the analog relays 64. The gold contacts are employed for accurate low current signal measurements and may burn off due to the higher currents associated with the functions employed with the power relays 106. However, this does not effect the operation of the higher currents experiences by the relays 104, 106 and 108. In a preferred aspect of the invention, each relay 64, 66, 68, 70, 104, 106 and 108 is releasably engageble in a socket. This allows for simple and easy fault isolation and repair of the relays utilized in the test system 10.

Figure 6:
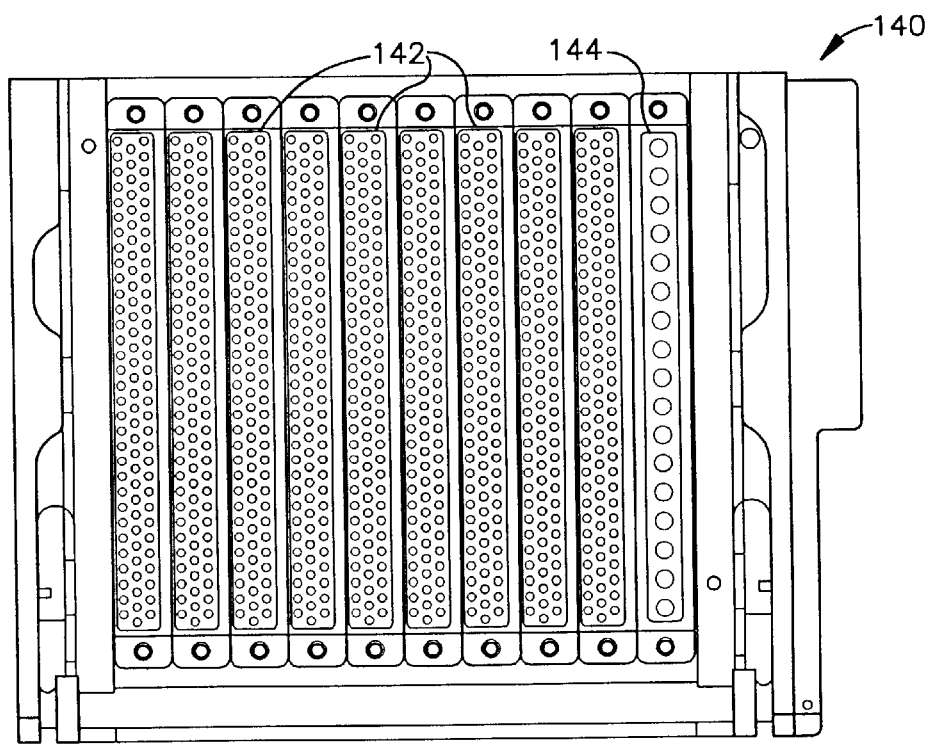
FIG. 6 illustrates a plan view of a tester interface panel in accordance with one aspect of the present invention.

FIG. 6 illustrates the tester interface panel 16. The tester interface panel 16 includes nine 96-pin connectors 142 and a single 19-pin power connector 144. The nine 96-pin connectors provide a variety of different pin-outs for the measuring and testing of industrial control modules. The single 19-pin power connector 144 typically provides pin-outs for higher power signals employed in the measuring and testing of industrial control modules. An example of a possible pin-out configuration for each connector is provided in an appendix attached to the end of this specification. The 19-pin power connector 144 is labeled as slot 1, while the remaining connectors 142 moving away from the 19-pin power connector 144 are labeled slots 2–10. It is to be appreciated that various pin-out configurations may be employed to carry out the present invention.

Figure 7A:
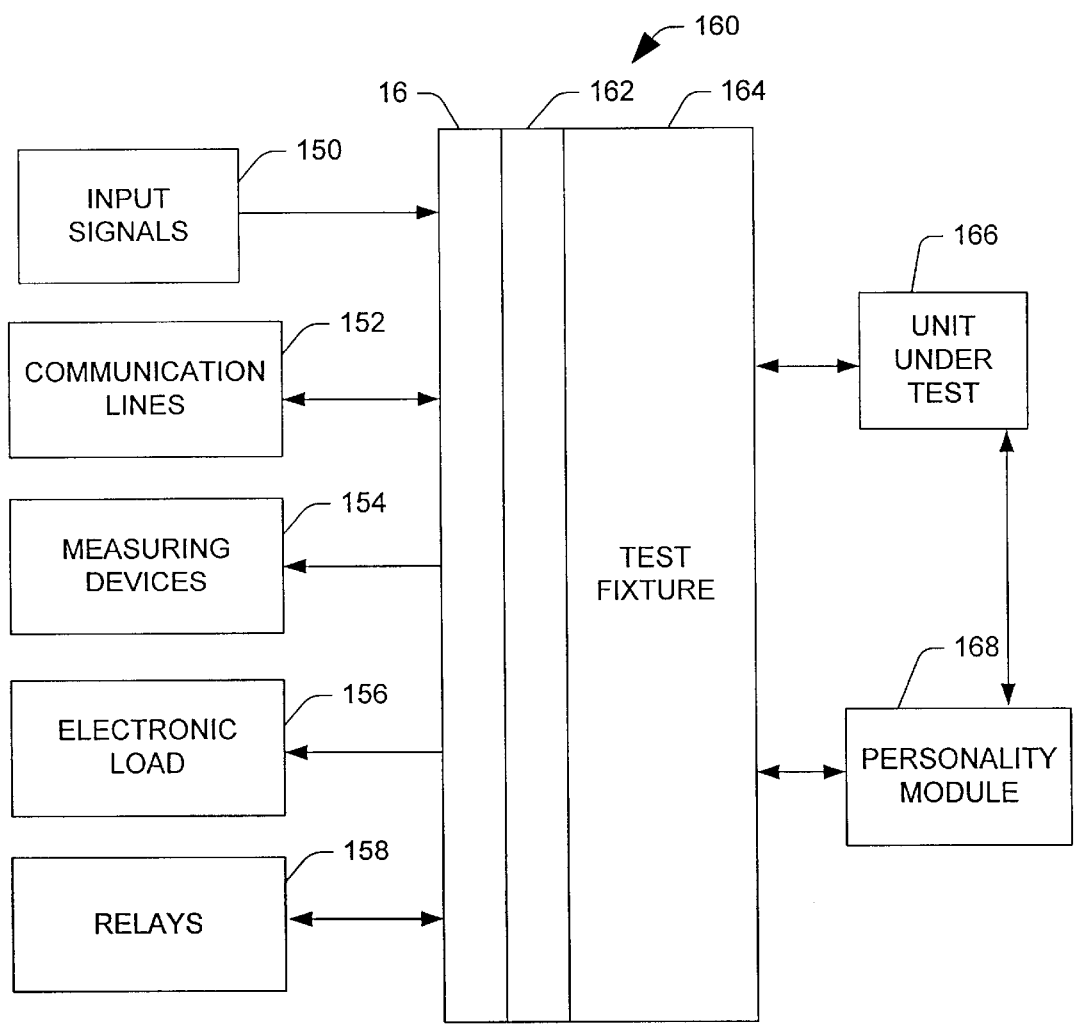
FIG. 7a illustrates a block schematic diagram of wiring from a test system to a unit under test in accordance with one aspect of the present invention.

FIG. 7a illustrates an exemplary wiring configuration for test system 10. The test system 10 includes input signals 150, communication lines 152, measurement device lines 154, electronic load lines 156 and relay lines 158 coupled to the tester interface panel 16. By providing all input signals, communication lines, measurement device lines, electronic load lines and relay lines, at the tester interface panel 16, wiring of the UUT to a test fixture 160 is easily facilitated. The test fixture 160 includes a test fixture interface portion 162 and a test fixture wiring portion 164. The test fixture interface portion 162 is adapted to mate to the tester interface panel 16. The test fixture wiring portion 164 provides wiring from the tester fixture panel 16 to a UUT 166. The test fixture wiring portion 164 may include any hardware and/or software necessary to test a product family of industrial control modules. The test fixture wiring portion 164 also provides wiring from the tester fixture panel 16 to a personality module 168. The personality module 168 is configurable to test different product types of a product family by providing different wiring configurations to the UUT 166. Typically, the test fixture 160 provides communication line signals 152 and other miscellaneous signals to the UUT 166, while the personality module 168 provides the remaining signals to the UUT 166. The use of personality modules provides a significant cost reduction in lieu of providing a separate test fixture for each product type.

Figure 7B:
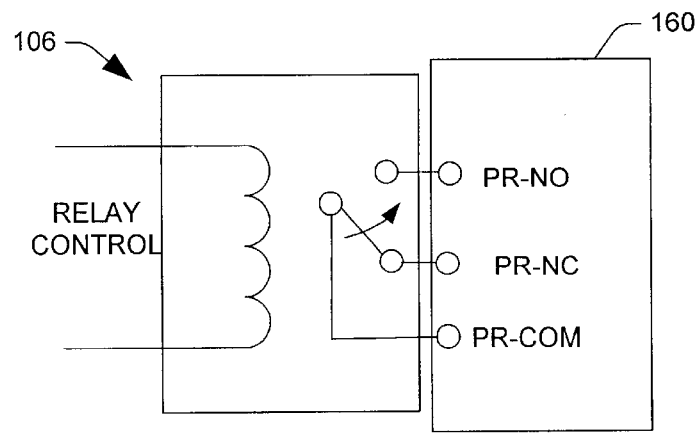
FIG. 7b illustrates a block schematic diagram of a relay being configured as a power relay in accordance with one aspect of the present invention.
Figure 7C:
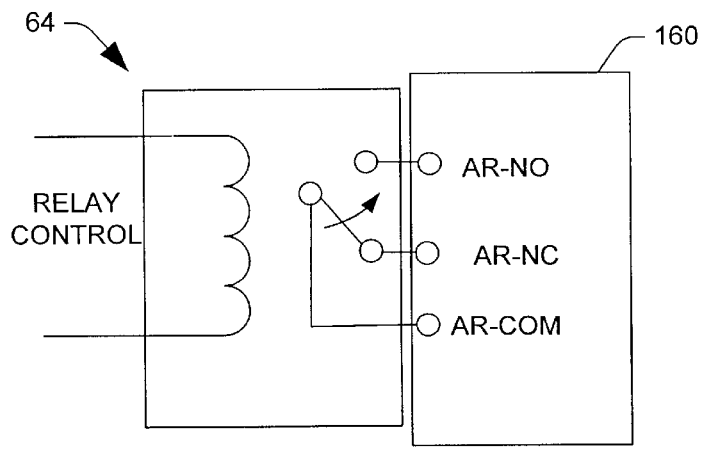
FIG. 7c illustrates a block schematic diagram of a relay being configured as an analog relay in accordance with one aspect of the present invention.
Figure 7D:
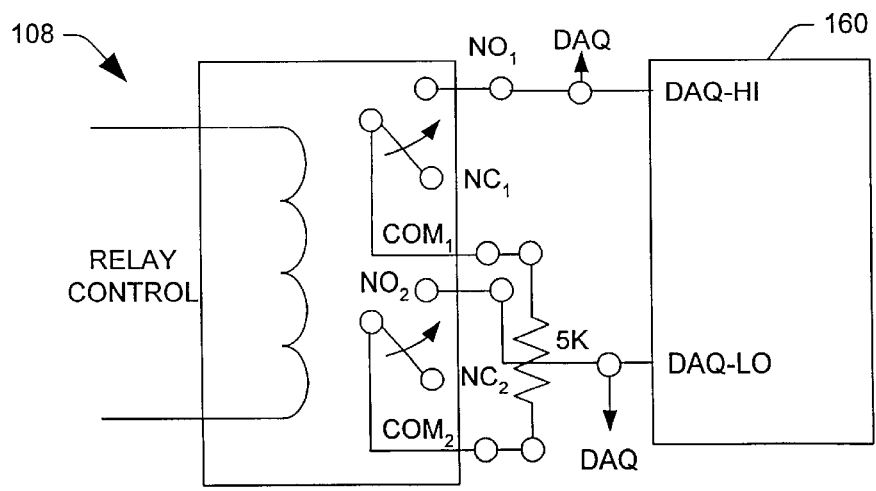
FIG. 7d illustrates a block schematic diagram of a relay being configured as a minimum current relay in accordance with one aspect of the present invention.

FIGS. 7b–7d illustrate the various configurations associated with relays employed in the test system 10. FIG. 7b refers to a relay being configured to operate as a power relay. The power relay 106 includes a normally open contact (PR-NO), a common contact (PR-COM) and a normally closed contact (PR-NC). Each contact is connected to the tester interface panel 16 and is accessible by a test fixture development designer.

Power input stimulus or the electronic load may be connected to the PR-NO contact and the PR-COM contact, so that the industrial control module input and/or output can be tested by switching the power relay 106 to its normally open state. In certain applications, it is desired to apply a load to an output on power up. In this situation, the load may be connected across the PR-NC contact and the PR-COM contact. FIG. 7c refers to a relay being configured to operate as an analog relay. The analog relay 64 includes a normally open contact (AR-NO), a common contact (AR-COM) and a normally closed contact (AR-NC). Each contact is connected to the tester interface panel 16 and is accessible by a test fixture development designer. By providing all relay connection points to the test fixture panel 16, each relay becomes autoconfigurable to a test engineer's desired utilization. It is to be appreciated that by employing the similar or the same relays for the power relay 106 and the analog relay 64, a test developer may employ either relay for input stimulus, load connections and measurement lines.

FIG. 7d refers to a relay being configured to operate as a minimum current relay. The minimum current relay 108 includes a pair of normally open contacts ($NO_1$ and $NO_2$), a pair of common contacts ($COM_1$ and $COM_2$) and a pair of normally closed contact ($NC_1$ and $NC_2$). The minimum current relay 108 is a double pole double throw relay with a single coil. The $COM_1$ and $COM_2$ contacts are coupled to one another through a 5 K resistor. The $NO_1$ contact is coupled to a DAQ-HI line of the DAQ 40 and the $NO_2$ contact is coupled to a DAQ-LO line of the DAQ 40. The DAQ-HI line and the DAQ-LO lines are connected to the tester interface panel 16 and are accessible by a test fixture development designer for testing both leakage current when the minimum current relay 108 is in its normally open position and for testing other functions when the minimum current relay 108 is in its normally closed position. The DAQ-HI and DAQ-LO signals are available to the test designer for measuring analog signals and converting these signals to digital signals for processing by the computer 30 when the minimum current relay 108 is in its normally closed state. The DAQ-HI and DAQ-LO signals are coupled to a 5 K ohm resistor when the minimum current relay 108 is switched to its normally open state for leakage testing. Conventional systems employ the coupling and decoupling of the electronic load to each signal of an industrial control module. The present invention allows for leakage testing of industrial control module signals with more accuracy and at a much faster rate than conventional systems. The power relays 106 and the analog relays 108 may also employ double pole double throw switches. However, similar contacts would be coupled together, therefore, only a single pole is illustrated in FIGS. 7b and 7c.

Figure 8:
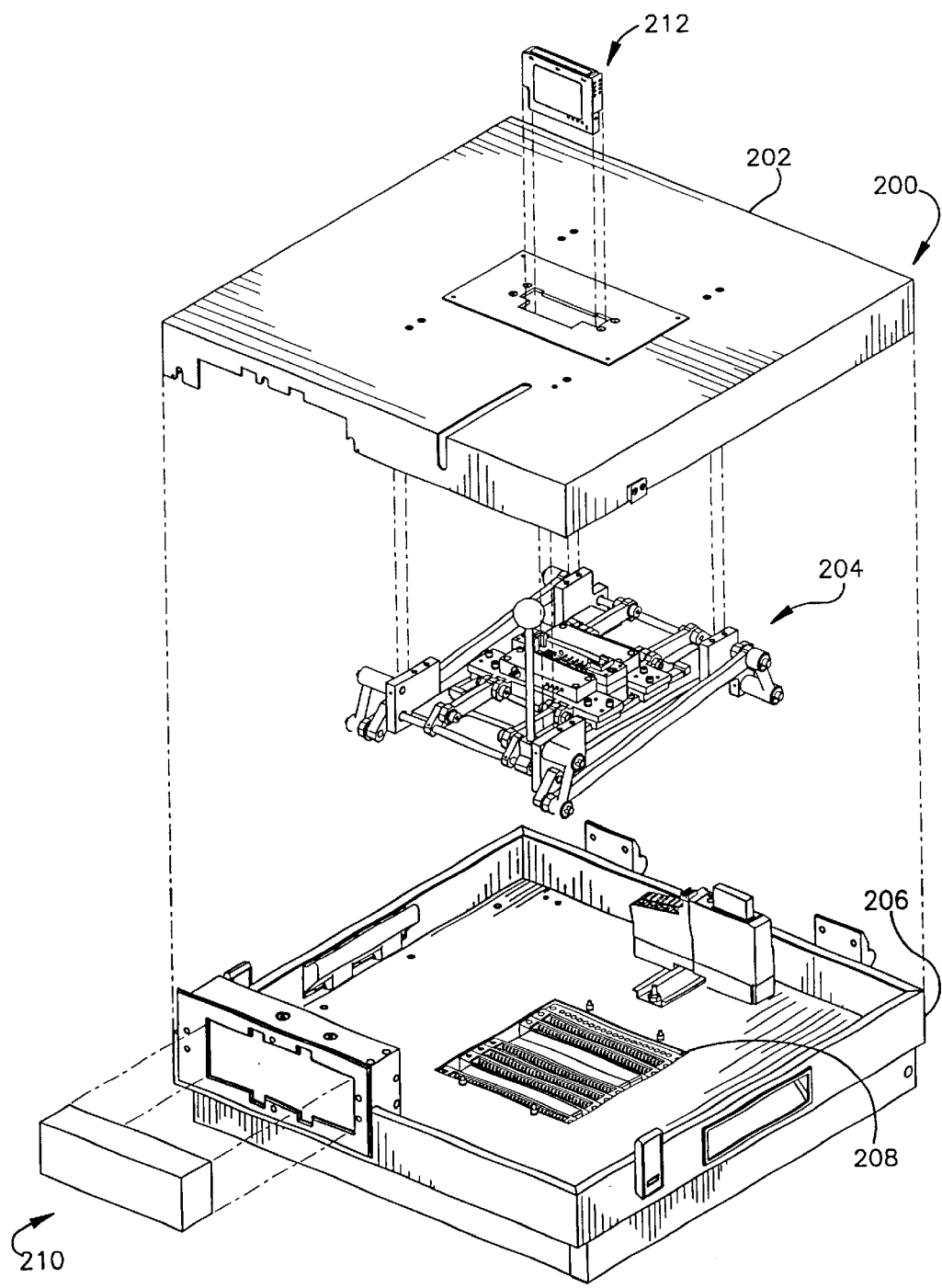
FIG. 8 illustrates an exploded perspective view of a test fixture in accordance with one aspect of the present invention.

FIG. 8 illustrates a test fixture 200 adapted to interface with the test system 10. The test fixture 200 includes a top panel 202 and a bottom panel 206. The bottom panel 206 has a test fixture interface panel 208 disposed therein. The bottom panel 206 also includes a receptacle for receiving a personality module 210. A UUT interface system 204 is provided between the top panel 202 and the bottom panel 206. The UUT interface system is adapted to mechanically and electrically connect to a UUT 212. The UUT 212 is inserted through a slot 212 and is received and clamped in place by the UUT interface system 204. As previously stated, the test fixture 200 is designed to interface with a family of UUTs and includes the necessary mechanical interface and electrical interfaces (not shown) to accomplish this endeavor. Additionally, the personality module 210 provides the electrical interfaces necessary to test different UUT types of a family of UUTs.

Figure 9A:
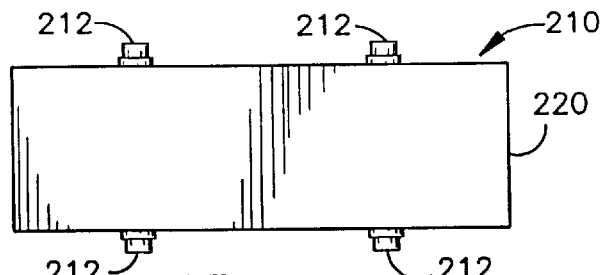
FIG. 9a illustrates a rear view of a personality module in accordance with one aspect of the present invention.
Figure 9B:
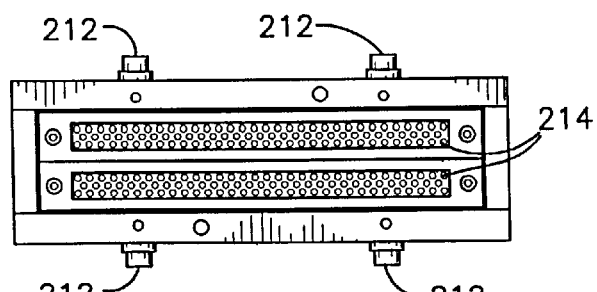
FIG. 9b illustrates a front view of the personality module of FIG. 9a in accordance with one aspect of the present invention.

FIG. 9a and FIG. 9b illustrate a rear view and a front view, respectively, of the personality module 210. The personality module 210 includes an outer cover 220 and four fasteners 212. Fasteners 212 hold a pair of 96-pin connectors 214 in place.

Figure 9C:
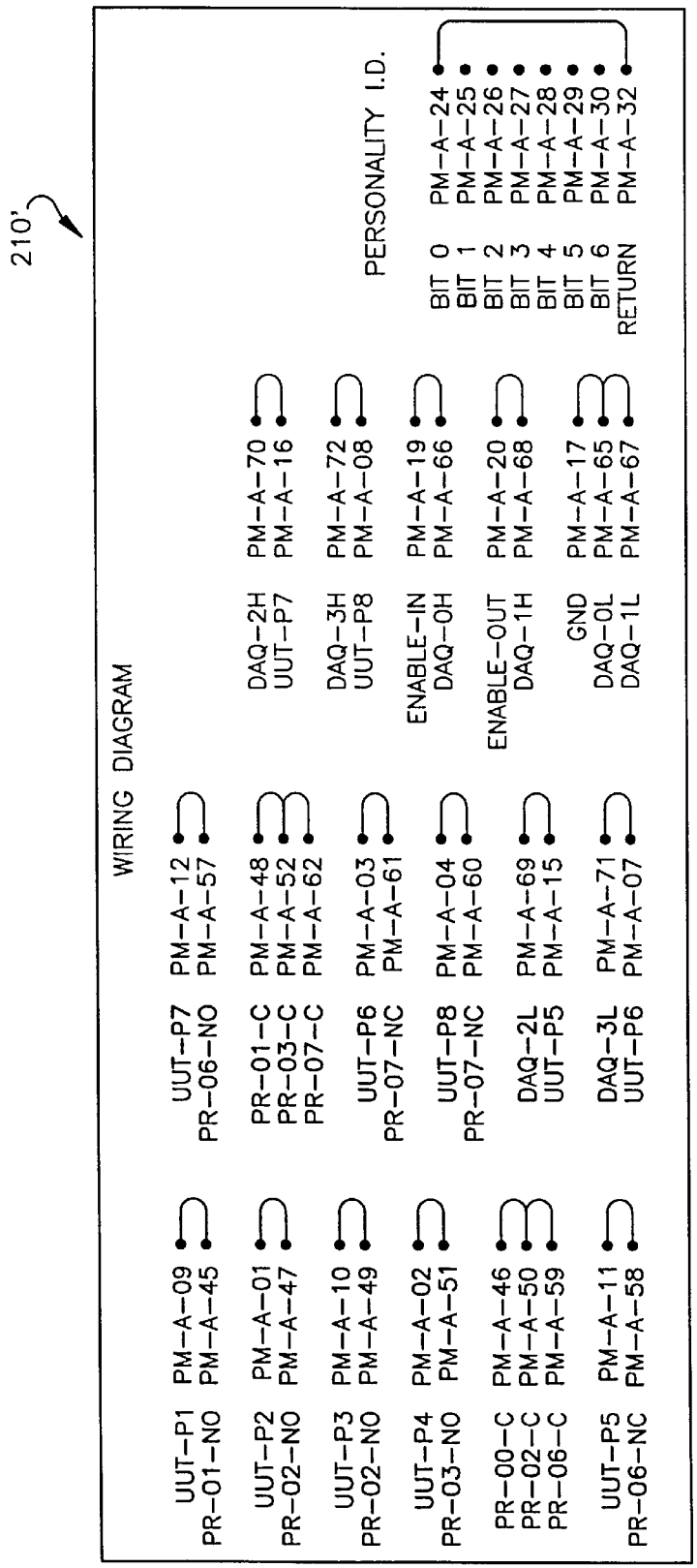
FIG. 9c illustrates an example of a schematic wiring diagram of the personality module of FIGS. 9a–9b in accordance with the present invention.

Fasteners 212 are also employed in providing a mechanism for holding or clamping in place the personality module 210 into the receptacle of the test fixture 200. The 96-pin connectors 214 receive signals from the tester interface panel 16 via the test fixture 200. The signals are then rerouted based on the type of control module to the UUT by an appropriate wiring configuration of the personality module. FIG. 9c illustrates an example of a personality module wiring configuration 210'. It is to be appreciated that various wiring configurations of both the test fixture 200 and the personality module 210 can be employed based on the UUT family and the UUT type.

Figure 10A:
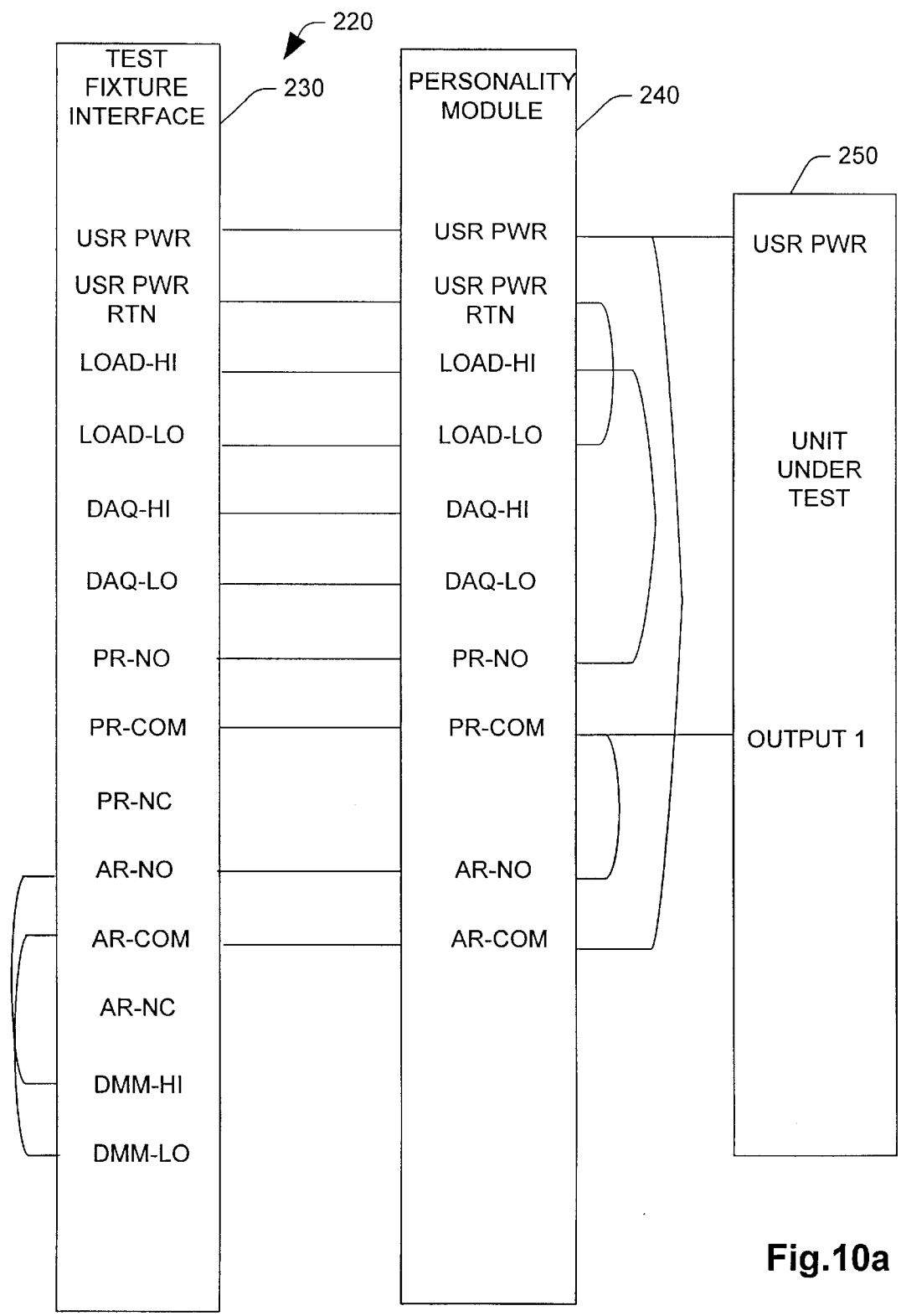
FIG. 10a illustrates a schematic block diagram of wiring between a test fixture, a personality module and an output module in accordance with the present invention.
Figure 10B:
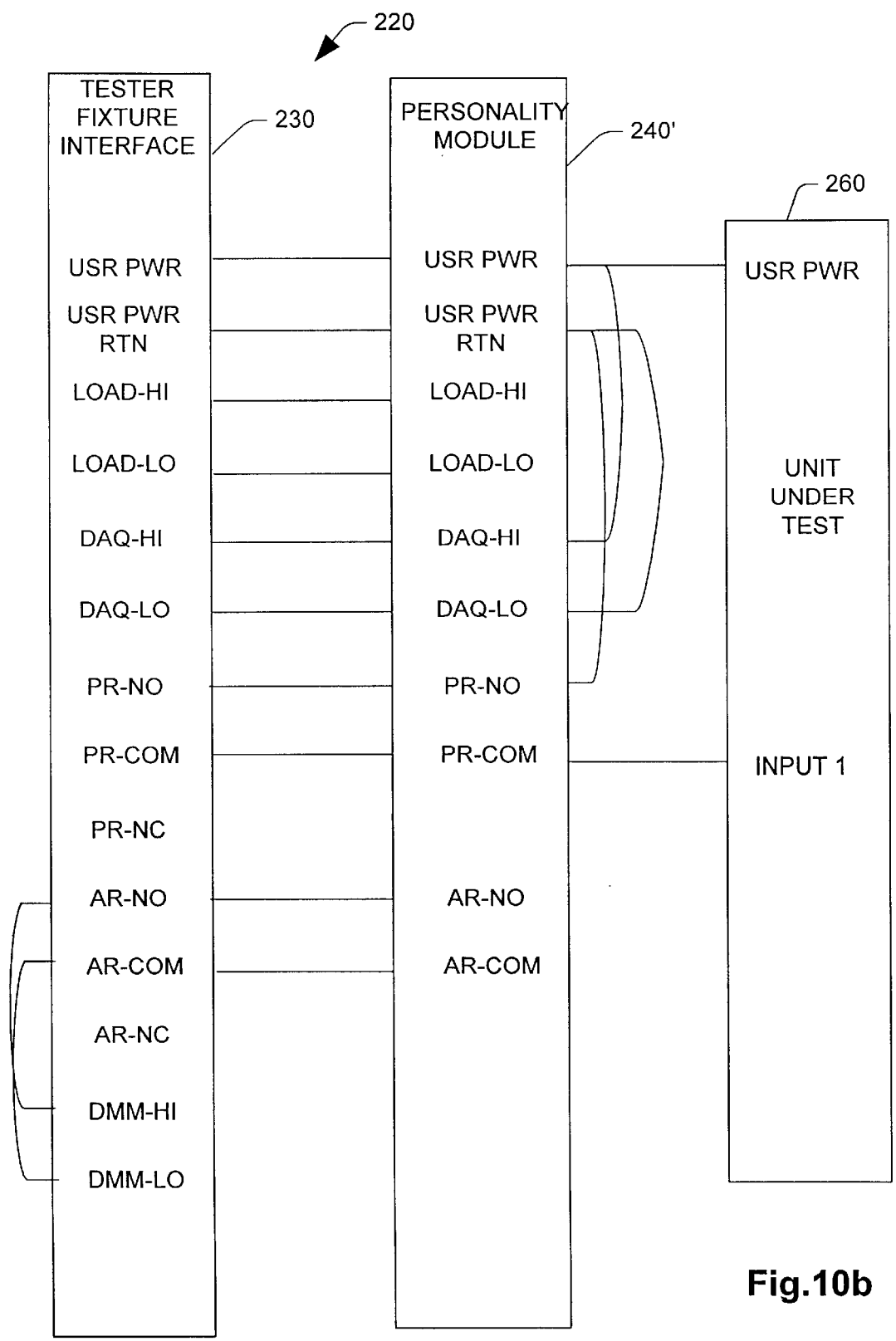
FIG. 10b illustrates a schematic block diagram of wiring between the test fixture of FIG. 10a, a personality module and an input module in accordance with the present invention.

FIGS. 10a and 10b illustrates an example of a typically wiring arrangement of a test fixture 220 where the only changes in the wiring between product types is accomplished by employing different wiring arrangements in different personality modules plugged into the same test fixture 220. FIG. 10a illustrates a test fixture interface panel 230 wired to a personality module 240. The personality module 240 is wired to test a sourcing DC output module 250. As shown in FIG. 10a, several signals are provided from the test fixture interface panel 230 to the personality module 240. A DMM-HI line is jumpered to a AR-NO line and a DMM-LO line is jumpered to a AR-COM line on the test fixture interface panel 230. It is to be appreciated that these connection may also occur at the personality module 240. The AR-NO line is jumpered to a PR-COM line on the personality module 240 and the PR-COM line is connected to an OUTPUT 1 signal of the sourcing DC output module 250. A LOAD-HI line is jumpered to a PR-NO line on the personality module 240 and the AR-COM line is jumpered to a USR PWR line on the personality module 240. A USR PWR RTN line is jumpered to a LOAD-LO line on the personality module 240 and the USR PWR line on the personality module 240 is connected to a USR PWR line on the DC output module 250. OUTPUT 1 can be turned on using a communication link (now shown) and the power relay (PR) switched to its normally open position causing the electronic load to be applied across the OUTPUT 1. The analog relay (AR) can be switched to its normally open position causing the terminals of the DMM to be placed across OUTPUT 1 and the USR PWR line to determine if the OUTPUT 1 is operating properly.

FIG. 10*b* illustrates the test fixture 220 employing a personality module 240' wired differently than the personality module 240 illustrated in FIG. 10*a*. The personality module 240' is wired to test a sourcing DC input module 260. The test fixture interface panel 230 to personality module 240' wiring is not changed with respect to FIG. 10*a*. Therefore, the same test fixture may be employed with different personality modules to test different types of industrial control modules as long as the mechanical interface of the UUTs are the same. As shown in FIG. 10*b*, the USR PWR RTN line is jumpered to the PR-NO line and a DAQ-LO line on the personality module 240'. The USR PWR line is jumpered to a DAQ-HI line on the personality module 240' and is also connected to the USR PWR line on the DC input module 260. The PR-COM line is connected to an INPUT 1 signal on the DC input module 260. The power relay (PR) can be switched to its normally open position causing an input voltage to be applied across the INPUT 1 of the input module 260. The potential of this input voltage can be verified by reading the DAQ. The input module 260 can be read using a communication link (not shown) to determine if the INPUT 1 is operating properly. It is to be appreciated that a variety of module types may be tested by providing different wiring configuration of personality modules according to the aforementioned methodology.

Figure 11:
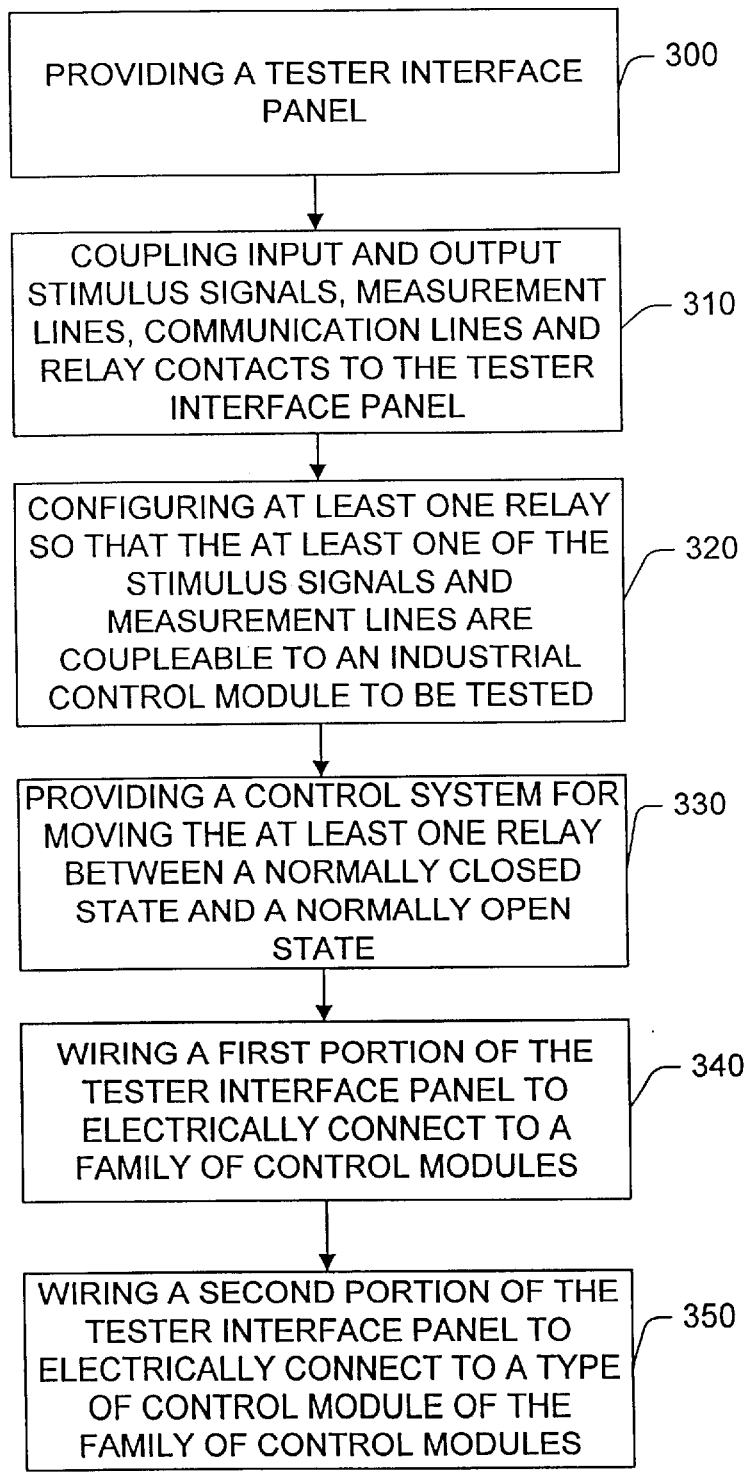
FIG. 11 is a flow diagram illustrating one particular methodology for carrying out the present invention.

FIG. 11 is a flow diagram illustrating one particular methodology for carrying out the present invention. In step 300, a tester interface panel is provided. In step 310, input and output stimulus signals, measurement lines, communication lines and relay contacts are coupled to the tester interface panel. In step 320, at least one relay is configured so that the at least one of the stimulus signals and measurement lines are coupleable to an industrial control module to be tested. In step 330, a control system is provided for moving the at least one relay between a normally closed state and a normally open state. A first portion of the tester interface panel is wired to electrically connect a family of control modules in step 340, and a second portion of the tester interface panel is wired to electrically connect to a specific type of control module of the family of control modules in step 350.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

APPENDIX

| Pin | Description |
|---|---|
| | 1.1. Slot #1 Pin Assignments - Power supplies, Electronic Load, and ControlNet |
| 1 | Ac Line signal |
| 2 | Ac Line return |
| 3 | AC/High power DC + 0–300 Volts AC 0–300 Volts DC HP 6812A |
| 4 | AC/High power DC − 0–300 Volts AC 0–300 Volts DC HP 6812A |
| 5 | DC power supply #1 + 0–60 volts 2.5 Amps HP66104A |
| 6 | DC power supply #1 − 0–60 volts 2.5 Amps HP66104A |
| 7 | DC power supply #2 + 0–8 volts 16 Amps HP66101A |
| 8 | DC power supply #2 − 0–8 volts 16 Amps HP66101A |
| 9 | DC power supply #3 + 0–35 volts 4.5 Amps HP66103A |
| 10 | DC power supply #3 − 0–35 volts 4.5 Amps HP66103A |
| 11 | DC power supply #4 + Optional |
| 12 | DC power supply #4 − Optional |
| 13 | 24 volt DC relay supply + |
| 14 | 24 volt DC relay supply − |
| 15 | Chassis ground |
| 16 | Electronic Load Input- H |
| 17 | Electronic Load Input - L |
| 18 | ControlNet coaxial #1 |
| 19 | ControlNet coaxial #2 |
| | 1.2. Slot #2 Assignments - P. Supply Sense Lines, Elec. Load Shunt, System I/O, and Communications (USB, DeviceNet, Rio, RS-232, PTC ControlNet) |
| 1 | System 24 v output #0 L |
| 2 | System 24 v output #1 L |
| 3 | System 24 v output #2 L |
| 4 | System 24 v output #3 L |
| 5 | System 24 v output #4 L |
| 6 | System 24 v output #5 L |
| 7 | System 24 v output #6 L |
| 8 | System 24 v output #7 L |
| 9 | Unused |
| 10 | ↓ |
| 11 | ↓ |
| 12 | ↓ |
| 13 | ↓ |
| 14 | ↓ |
| 15 | ↓ |
| 16 | ↓ |
| 17 | ↓ |
| 18 | ↓ |
| 19 | ↓ |
| 20 | RiO 1 Blue |
| 21 | RiO 1 Shield |
| 22 | RiO 1 Clear |
| 23 | Unused |
| 24 | RS-232 CH. 1-1 CD |
| 25 | RS-232 CH. 1-2 RX |
| 26 | RS-232 CH. 1-3 TX |
| 27 | RS-232 CH. 1-4 DTR |
| 28 | RS-232 CH. 1-5 GND |
| 29 | RS-232 CH. 1-6 DSR |
| 30 | RS-232 CH. 1-7 RTS |
| 31 | RS-232 CH. 1-8 CTS |
| 32 | RS-232 CH. 1-9 RI |
| 33 | HP 6812A Sense + |
| 34 | HP 6812A Sense − |
| 35 | DC PS #1 Sense + |
| 36 | DC PS #1 Sense − |
| 37 | DC PS #2 Sense + |
| 38 | DC PS #2 Sense − |
| 39 | DC PS #3 Sense + |
| 40 | DC PS #3 Sense − |
| 41 | DC PS #4 Sense + |
| 42 | DC PS #4 Sense − |
| 43 | Electronic Load Shunt + |
| 44 | Electronic Load Shunt − |
| 45 | Unused |
| 46 | USB 1 Vbus |
| 47 | USB 1 D+ |
| 48 | USB 1 D− |

APPENDIX-continued

| Pin | Description |
|---|---|
| 49 | USB 1 Gnd |
| 50 | Unused |
| 51 | DeviceNet Power+ |
| 52 | DeviceNet Signal R |
| 53 | DeviceNet return |
| 54 | DeviceNet Signal L |
| 55 | DeviceNet Power − |
| 56 | Unused |
| 57 | ControlNet PTC Shield |
| 58 | ControlNet PTC NC |
| 59 | ControlNet PTC Tx_H |
| 60 | ControlNet PTC Tx_L |
| 61 | ControlNet PTC Rx_L |
| 62 | ControlNet PTC Rx_H |
| 63 | ControlNet PTC NC |
| 64 | ControlNet PTC Shield |
| 65 | System 24 v input #0 L |
| 66 | System 24 v input #1 L |
| 67 | System 24 v input #2 L |
| 68 | System 24 v input #3 L |
| 69 | System 24 v input #4 L |
| 70 | System 24 v input #5 L |
| 71 | System 24 v input #6 L |
| 72 | System 24 v input #7 L |
| 73 | Unused |
| 74 | ↓ |
| 75 | ↓ |
| 76 | ↓ |
| 77 | ↓ |
| 78 | USB 2 Vbus |
| 79 | USB2 D+ |
| 80 | USB 2 D− |
| 81 | USB 2 Gnd |
| 82 | Unused |
| 83 | ↓ |
| 84 | RiO 2 Blue |
| 85 | RiO 2 Shield |
| 86 | RiO 2 Clear |
| 87 | Unused |
| 88 | RS-232 CH. 2-1 CD |
| 89 | RS-232 CH. 2-2 RX |
| 90 | RS-232 CH. 2-3 Tx |
| 91 | RS-232 CH. 2-4 DTR |
| 92 | RS-232 CH. 2-5 GND |
| 93 | RS-232 CH. 2-6 DSR |
| 94 | RS-232 CH. 2-7 RTS |
| 95 | RS-232 CH. 2-8 CTS |
| 96 | RS-232 CH. 2-9 RI |

1.3. Slot #3 Assignments - Analog Relays

| Pin | Description |
|---|---|
| 1 | Analog Relay - 0H |
| 2 | Analog Relay - 0L |
| 3 | Analog Relay - 1H |
| 4 | Analog Relay - 1L |
| 5 | Analog Relay - 2H |
| 6 | Analog Relay - 2L |
| 7 | Analog Relay - 3H |
| 8 | Analog Relay - 3L |
| 9 | Analog Relay - 4H |
| 10 | Analog Relay - 4L |
| 11 | Analog Relay - 5H |
| 12 | Analog Relay - 5L |
| 13 | Analog Relay - 6H |
| 14 | Analog Relay - 6L |
| 15 | Analog Relay - 7H |
| 16 | Analog Relay - 7L |
| 17 | Analog Relay - 8H |
| 18 | Analog Relay - 8L |
| 19 | Analog Relay - 9H |
| 20 | Analog Relay - 9L |
| 21 | Analog Relay - 10H |
| 22 | Analog Relay - 10L |
| 23 | Analog Relay - 11H |
| 24 | Analog Relay - 11L |
| 25 | Analog Relay - 12H |
| 26 | Analog Relay - 12L |
| 27 | Analog Relay - 13H |
| 28 | Analog Relay - 13L |
| 29 | Analog Relay - 14H |
| 30 | Analog Relay - 14L |
| 31 | Analog Relay - 15H |
| 32 | Analog Relay - 15L |
| 33 | Analog Relay - 16H |
| 34 | Analog Relay - 16L |
| 35 | Analog Relay - 17H |
| 36 | Analog Relay - 17L |
| 37 | Analog Relay - 18H |
| 38 | Analog Relay - 18L |
| 39 | Analog Relay - 19H |
| 40 | Analog Relay - 19L |
| 41 | Analog Relay - 20H |
| 42 | Analog Relay - 20L |
| 43 | Analog Relay - 21H |
| 44 | Analog Relay - 21L |
| 45 | Analog Relay - 22H |
| 46 | Analog Relay - 22L |
| 47 | Analog Relay - 23H |
| 48 | Analog Relay - 23L |
| 49 | Analog Relay - 24H |
| 50 | Analog Relay - 24L |
| 51 | Analog Relay - 25H |
| 52 | Analog Relay - 25L |
| 53 | Analog Relay - 26H |
| 54 | Analog Relay - 26L |
| 55 | Analog Relay - 27H |
| 56 | Analog Relay - 27L |
| 57 | Analog Relay - 28H |
| 58 | Analog Relay - 28L |
| 59 | Analog Relay - 29H |
| 60 | Analog Relay - 29L |
| 61 | Analog Relay - 30H |
| 62 | Analog Relay - 30L |
| 63 | Analog Relay - 31H |
| 64 | Analog Relay - 31L |
| 65 | Analog Relay - 32H |
| 66 | Analog Relay - 32L |
| 67 | Analog Relay - 33H |
| 68 | Analog Relay - 33L |
| 69 | Analog Relay - 34H |
| 70 | Analog Relay - 34L |
| 71 | Analog Relay - 35H |
| 72 | Analog Relay - 35L |
| 73 | Analog Relay - 36H |
| 74 | Analog Relay - 36L |
| 75 | Analog Relay - 37H |
| 76 | Analog Relay - 37L |
| 77 | Analog Relay - 38H |
| 78 | Analog Relay - 38L |
| 79 | Analog Relay - 39H |
| 80 | Analog Relay - 39L |
| 81 | Analog Relay - 40H |
| 82 | Analog Relay - 40L |
| 83 | Analog Relay - 41H |
| 84 | Analog Relay - 41L |
| 85 | Analog Relay - 42H |
| 86 | Analog Relay - 42L |
| 87 | Analog Relay - 43H |
| 88 | Analog Relay - 43L |
| 89 | Analog Relay - 44H |
| 90 | Analog Relay - 44L |
| 91 | Analog Relay - 45H |
| 92 | Analog Relay - 45L |
| 93 | Analog Relay - 46H |
| 94 | Analog Relay - 46L |
| 95 | Analog Relay - 47H |
| 96 | Analog Relay - 47L |

1.4. Slot #4 Assignments - Precision DMM, Precision Voltage/Current Source, Waveform Generator

| Pin | Description |
|---|---|
| 1 | EDC 522 Analog Source - H |
| 2 | EDC 522 Analog Source - L |
| 3 | EDC 522 Analog Sense - H |
| 4 | EDC 522 Analog Sense - L |
| 5 | Unused |

APPENDIX-continued

| Pin | Description |
|---|---|
| 6 | ↓ |
| 7 | ↓ |
| 8 | ↓ |
| 9 | ↓ |
| 10 | ↓ |
| 11 | ↓ |
| 12 | ↓ |
| 13 | ↓ |
| 14 | ↓ |
| 15 | ↓ |
| 16 | ↓ |
| 17 | ↓ |
| 18 | ↓ |
| 19 | ↓ |
| 20 | ↓ |
| 21 | ↓ |
| 22 | ↓ |
| 23 | ↓ |
| 24 | ↓ |
| 25 | ↓ |
| 26 | ↓ |
| 27 | ↓ |
| 28 | ↓ |
| 29 | ↓ |
| 30 | ↓ |
| 31 | ↓ |
| 32 | ↓ |
| 33 | Waveform Generator Ch. 1 - H |
| 34 | Waveform Generator Ch. 1 - L |
| 35 | Waveform Generator Ch. 2 - H |
| 36 | Waveform Generator Ch. 2 - L |
| 37 | Waveform Gen. Ext. Trig - H |
| 38 | Waveform Gen. Ext. Trig - L |
| 39 | Unused |
| 40 | ↓ |
| 41 | ↓ |
| 42 | ↓ |
| 43 | ↓ |
| 44 | ↓ |
| 45 | ↓ |
| 46 | ↓ |
| 47 | ↓ |
| 48 | ↓ |
| 49 | ↓ |
| 50 | ↓ |
| 51 | ↓ |
| 52 | ↓ |
| 53 | ↓ |
| 54 | ↓ |
| 55 | ↓ |
| 56 | ↓ |
| 57 | ↓ |
| 58 | ↓ |
| 59 | ↓ |
| 60 | ↓ |
| 61 | ↓ |
| 62 | ↓ |
| 63 | ↓ |
| 64 | ↓ |
| 65 | HP 3458A DMM Input - H |
| 66 | HP 3458A DMM Input - L |
| 67 | HP 3458A DMM Sense - H |
| 68 | HP 3458A DMM Sense - L |
| 69 | HP 3458A DMM Current |
| 70 | Unused |
| 71 | ↓ |
| 72 | ↓ |
| 73 | ↓ |
| 74 | ↓ |
| 75 | ↓ |
| 76 | ↓ |
| 77 | ↓ |
| 78 | ↓ |
| 79 | ↓ |
| 80 | ↓ |
| 81 | ↓ |
| 82 | ↓ |
| 83 | ↓ |
| 84 | ↓ |
| 85 | ↓ |
| 86 | ↓ |
| 87 | ↓ |
| 88 | ↓ |
| 89 | ↓ |
| 90 | ↓ |
| 91 | ↓ |
| 92 | ↓ |
| 93 | ↓ |
| 94 | ↓ |
| 95 | ↓ |
| 96 | ↓ |

1.5. Slot #6 Assignments - User I/O (Negative logic - Active low)

| Pin | Description | | |
|---|---|---|---|
| 1 | 24 Volt Output- | | 0 |
| 2 | ↓ | | 1 |
| 3 | ↓ | | 2 |
| 4 | ↓ | | 3 |
| 5 | ↓ | | 4 |
| 6 | ↓ | | 5 |
| 7 | ↓ | | 6 |
| 8 | ↓ | | 7 |
| 9 | ↓ | | 8 |
| 10 | ↓ | | 9 |
| 11 | ↓ | | 10 |
| 12 | ↓ | | 11 |
| 13 | ↓ | | 12 |
| 14 | ↓ | | 13 |
| 15 | ↓ | | 14 |
| 16 | ↓ | | 15 |
| 17 | 24 Volt Input- | | 0 |
| 18 | ↓ | | 1 |
| 19 | ↓ | | 2 |
| 20 | ↓ | | 3 |
| 21 | ↓ | | 4 |
| 22 | ↓ | | 5 |
| 23 | ↓ | | 6 |
| 24 | ↓ | | 7 |
| 25 | ↓ | | 8 |
| 26 | ↓ | | 9 |
| 27 | ↓ | | 10 |
| 28 | ↓ | | 11 |
| 29 | ↓ | | 12 |
| 30 | ↓ | | 13 |
| 31 | ↓ | | 14 |
| 32 | ↓ | | 15 |
| 33 | Fixture Id | Compatibility - 0 | |
| 34 | ↓ | Compatibility - 1 | |
| 35 | ↓ | Compatibility - 2 | |
| 36 | ↓ | Compatibility - 3 | |
| 37 | ↓ | STF | 0-LSB |
| 38 | ↓ | ↓ | 1 |
| 39 | ↓ | ↓ | 2 |
| 40 | ↓ | ↓ | 3 |
| 41 | ↓ | ↓ | 4 |
| 42 | ↓ | ↓ | 5 |
| 43 | ↓ | ↓ | 6 |
| 44 | ↓ | ↓ | 7 |
| 45 | ↓ | ↓ | 8 |
| 46 | ↓ | ↓ | 9 |
| 47 | ↓ | ↓ | 10 |
| 48 | ↓ | ↓ | 11-MSB |
| 49 | Id return - 24 volt negative | | |
| 50 | 24 Volt Input return - negative | | |
| 51 | 24 Volt Output return - positive | | |
| 52 | Unused | | |
| 53 | ↓ | | |
| 54 | ↓ | | |
| 55 | ↓ | | |
| 56 | ↓ | | |
| 57 | ↓ | | |
| 58 | ↓ | | |
| 59 | ↓ | | |
| 60 | ↓ | | |
| 61 | ↓ | | |

APPENDIX-continued

| Pin | Description |
|---|---|
| 62 | ↓ |
| 63 | ↓ |
| 64 | ↓ |
| 65 | Unused |
| 66 | ↓ |
| 67 | ↓ |
| 68 | ↓ |
| 69 | ↓ |
| 70 | ↓ |
| 71 | ↓ |
| 72 | ↓ |
| 73 | ↓ |
| 74 | ↓ |
| 75 | ↓ |
| 76 | ↓ |
| 77 | ↓ |
| 78 | ↓ |
| 79 | ↓ |
| 80 | ↓ |
| 81 | ↓ |
| 82 | ↓ |
| 83 | ↓ |
| 84 | ↓ |
| 85 | ↓ |
| 86 | ↓ |
| 87 | ↓ |
| 88 | ↓ |
| 89 | ↓ |
| 90 | ↓ |
| 91 | ↓ |
| 92 | ↓ |
| 93 | ↓ |
| 94 | ↓ |
| 95 | ↓ |
| 96 | ↓ |

1.6. Slot #8 Assignments - Data Acquisition Channels

| Pin | Description |
|---|---|
| 1 | DAQ Voltage ch0 - L |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | 10 |
| 12 | 11 |
| 13 | 12 |
| 14 | 13 |
| 15 | 14 |
| 16 | 15 |
| 17 | 16 |
| 18 | 17 |
| 19 | 18 |
| 20 | 19 |
| 21 | DAQ Voltage ch22 - L |
| 22 | 23 |
| 23 | 24 |
| 24 | 25 |
| 25 | 26 |
| 26 | 27 |
| 27 | 28 |
| 28 | 29 |
| 29 | 30 |
| 30 | 31 |
| 31 | 32 |
| 32 | 33 |
| 33 | Unused |
| 34 | ↓ |
| 35 | ↓ |
| 36 | ↓ |
| 37 | ↓ |
| 38 | ↓ |
| 39 | ↓ |
| 40 | ↓ |

APPENDIX-continued

| Pin | Description |
|---|---|
| 41 | ↓ |
| 42 | ↓ |
| 43 | ↓ |
| 44 | ↓ |
| 45 | ↓ |
| 46 | ↓ |
| 47 | ↓ |
| 48 | ↓ |
| 49 | ↓ |
| 50 | ↓ |
| 51 | ↓ |
| 52 | ↓ |
| 53 | DAQ current ch20 - I |
| 54 | DAQ current ch20 - L |
| 55 | DAQ current ch21 - I |
| 56 | DAQ current ch21 - L |
| 57 | Current Common ch20/21 - I |
| 58 | Current Common ch20/21 - L |
| 59 | DAQ current ch40 - I |
| 60 | DAQ current ch40 - L |
| 61 | DAQ current ch41 - I |
| 62 | DAQ current ch41 - L |
| 63 | Current Common ch40/41 - I |
| 64 | Current Common ch40/41 - L |
| 65 | DAQ Voltage ch0 - H |
| 66 | 1 |
| 67 | 2 |
| 68 | 3 |
| 69 | 4 |
| 70 | 5 |
| 71 | 6 |
| 72 | 7 |
| 73 | 8 |
| 74 | 9 |
| 75 | 10 |
| 76 | 11 |
| 77 | 12 |
| 78 | 13 |
| 79 | 14 |
| 80 | 15 |
| 81 | 16 |
| 82 | 17 |
| 83 | 18 |
| 84 | 19 |
| 85 | DAQ Voltage ch22 - H |
| 86 | 23 |
| 87 | 24 |
| 88 | 25 |
| 89 | 26 |
| 90 | 27 |
| 91 | 28 |
| 92 | 29 |
| 93 | 30 |
| 94 | 31 |
| 95 | 32 |
| 96 | 33 |

1.7. Slot #8 Assignments - Data Acquisition Channels for 4-wire ohm measurements. 12 channels available.

| Pin | Description |
|---|---|
| 1 | DAQ Ohm ch0 - L |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | DAQ Sense ch0 - L |
| 12 | 1 |
| 13 | 2 |
| 14 | 3 |
| 15 | 4 |
| 16 | 5 |
| 17 | 6 |
| 18 | 7 |

APPENDIX-continued

| Pin | Description |
|---|---|
| 19 | 8 |
| 20 | 9 |
| 21 | DAQ Ohm ch12 - L |
| 22 | DAQ Ohm ch13 - L |
| 23 | Unused |
| 24 | ↓ |
| 25 | ↓ |
| 26 | ↓ |
| 27 | ↓ |
| 28 | ↓ |
| 29 | ↓ |
| 30 | ↓ |
| 31 | DAQ Sense ch12 - L |
| 32 | DAQ Sense ch13 - L |
| 33 | Unused |
| 34 | ↓ |
| 35 | ↓ |
| 36 | ↓ |
| 37 | ↓ |
| 38 | ↓ |
| 39 | ↓ |
| 40 | ↓ |
| 41 | ↓ |
| 42 | ↓ |
| 43 | ↓ |
| 44 | ↓ |
| 45 | ↓ |
| 46 | ↓ |
| 47 | ↓ |
| 48 | ↓ |
| 49 | ↓ |
| 50 | ↓ |
| 51 | ↓ |
| 52 | ↓ |
| 53 | ↓ |
| 54 | ↓ |
| 55 | ↓ |
| 56 | ↓ |
| 57 | ↓ |
| 58 | ↓ |
| 59 | ↓ |
| 60 | ↓ |
| 61 | ↓ |
| 62 | ↓ |
| 63 | ↓ |
| 64 | ↓ |
| 65 | DAQ Ohm ch0 - H |
| 66 | 1 |
| 67 | 2 |
| 68 | 3 |
| 69 | 4 |
| 70 | 5 |
| 71 | 6 |
| 72 | 7 |
| 73 | 8 |
| 74 | 9 |
| 75 | DAQ Sense ch0 - H |
| 76 | 1 |
| 77 | 2 |
| 78 | 3 |
| 79 | 4 |
| 80 | 5 |
| 81 | 6 |
| 82 | 7 |
| 83 | 8 |
| 84 | 9 |
| 85 | DAQ Ohm ch12 - H |
| 86 | DAQ Ohm ch13 - H |
| 87 | Unused |
| 88 | ↓ |
| 89 | ↓ |
| 90 | ↓ |
| 91 | ↓ |
| 92 | ↓ |
| 93 | ↓ |
| 94 | ↓ |
| 95 | DAQ Sense ch12 - H |

APPENDIX-continued

| Pin | Description |
|---|---|
| 96 | DAQ Sense ch13 - H |
| | Slot #9 Assignments - Power Relays |
| 1 | Power Relay 0 - NO |
| 2 | Power Relay 0 - NC |
| 3 | Power Relay 0 - C |
| 4 | Power Relay 1 - NO |
| 5 | Power Relay 1 - NC |
| 6 | Power Relay 1 - C |
| 7 | Power Relay 2 - NO |
| 8 | Power Relay 2 - NC |
| 9 | Power Relay 2 - C |
| 10 | Power Relay 3 - NO |
| 11 | Power Relay 3 - NC |
| 12 | Power Relay 3 - C |
| 13 | Power Relay 4 - NO |
| 14 | Power Relay 4 - NC |
| 15 | Power Relay 4 - C |
| 16 | Power Relay 5 - NO |
| 17 | Power Relay 5 - NC |
| 18 | Power Relay 5 - C |
| 19 | Power Relay 6 - NO |
| 20 | Power Relay 6 - NC |
| 21 | Power Relay 6 - C |
| 22 | Power Relay 7 - NO |
| 23 | Power Relay 7 - NC |
| 24 | Power Relay 7 - C |
| 25 | Power Relay 8 - NO |
| 26 | Power Relay 8 - NC |
| 27 | Power Relay 8 - C |
| 28 | Power Relay 9 - NO |
| 29 | Power Relay 9 - NC |
| 30 | Power Relay 9 - C |
| 31 | Power Relay 10 - NO |
| 32 | Power Relay 10 - NC |
| 33 | Power Relay 10 - C |
| 34 | Power Relay 11 - NO |
| 35 | Power Relay 11 - NC |
| 36 | Power Relay 11 - C |
| 37 | Power Relay 12 - NO |
| 38 | Power Relay 12 - NC |
| 39 | Power Relay 12 - C |
| 40 | Power Relay 13 - NO |
| 41 | Power Relay 13 - NC |
| 42 | Power Relay 13 - C |
| 43 | Power Relay 14 - NO |
| 44 | Power Relay 14 - NC |
| 45 | Power Relay 14 - C |
| 46 | Power Relay 15 - NO |
| 47 | Power Relay 15 - NC |
| 48 | Power Relay 15 - C |
| 49 | Power Relay 16 - NO |
| 50 | Power Relay 16 - NC |
| 51 | Power Relay 16 - C |
| 52 | Power Relay 17 - NO |
| 53 | Power Relay 17 - NC |
| 54 | Power Relay 17 - C |
| 55 | Power Relay 18 - NO |
| 56 | Power Relay 18 - NC |
| 57 | Power Relay 18 - C |
| 58 | Power Relay 19 - NO |
| 59 | Power Relay 19 - NC |
| 60 | Power Relay 19 - C |
| 61 | Power Relay 20 - NO |
| 62 | Power Relay 20 - NC |
| 63 | Power Relay 20 - C |
| 64 | Power Relay 21 - NO |
| 65 | Power Relay 21 - NC |
| 66 | Power Relay 21 - C |
| 67 | Power Relay 22 - NO |
| 68 | Power Relay 22 - NC |
| 69 | Power Relay 22 - C |
| 70 | Power Relay 23 - NO |
| 71 | Power Relay 23 - NC |
| 72 | Power Relay 23 - C |
| 73 | Power Relay 24 - NO |
| 74 | Power Relay 24 - NC |

APPENDIX-continued

| Pin | Description |
|---|---|
| 75 | Power Relay 24 - C |
| 76 | Power Relay 25 - NO |
| 77 | Power Relay 25 - NC |
| 78 | Power Relay 25 - C |
| 79 | Power Relay 26 - NO |
| 80 | Power Relay 26 - NC |
| 81 | Power Relay 26 - C |
| 82 | Power Relay 27 - NO |
| 83 | Power Relay 27 - NC |
| 84 | Power Relay 27 - C |
| 85 | Power Relay 28 - NO |
| 86 | Power Relay 28 - NC |
| 87 | Power Relay 28 - C |
| 88 | Power Relay 29 - NO |
| 89 | Power Relay 29 - NC |
| 90 | Power Relay 29 - C |
| 91 | Power Relay 30 - NO |
| 92 | Power Relay 30 - NC |
| 93 | Power Relay 30 - C |
| 94 | Power Relay 31 - NO |
| 95 | Power Relay 31 - NC |
| 96 | Power Relay 31 - C |
| | 1.8. Slot #10 Assignments - Power Relays - continued |
| 1 | Power Relay 32 - NO |
| 2 | Power Relay 32 - NC |
| 3 | Power Relay 32 - C |
| 4 | Power Relay 33 - NO |
| 5 | Power Relay 33 - NC |
| 6 | Power Relay 33 - C |
| 7 | Power Relay 34 - NO |
| 8 | Power Relay 34 - NC |
| 9 | Power Relay 34 - C |
| 10 | Power Relay 35 - NO |
| 11 | Power Relay 35 - NC |
| 12 | Power Relay 35 - C |
| 13 | Power Relay 36 - NO |
| 14 | Power Relay 36 - NC |
| 15 | Power Relay 36 - C |
| 16 | Power Relay 37 - NO |
| 17 | Power Relay 37 - NC |
| 18 | Power Relay 37 - C |
| 19 | Power Relay 38 - NO |
| 20 | Power Relay 38 - NC |
| 21 | Power Relay 38 - C |
| 22 | Power Relay 39 - NO |
| 23 | Power Relay 39 - NC |
| 24 | Power Relay 39 - C |
| 25 | Unused |
| 26 | ↓ |
| 27 | ↓ |
| 28 | ↓ |
| 29 | ↓ |
| 30 | ↓ |
| 31 | ↓ |
| 32 | ↓ |
| 33 | Unused |
| 34 | ↓ |
| 35 | ↓ |
| 36 | ↓ |
| 37 | ↓ |
| 38 | ↓ |
| 39 | ↓ |
| 40 | ↓ |
| 41 | ↓ |
| 42 | ↓ |
| 43 | ↓ |
| 44 | ↓ |
| 45 | ↓ |
| 46 | ↓ |
| 47 | ↓ |
| 48 | ↓ |
| 49 | ↓ |
| 50 | ↓ |
| 51 | ↓ |
| 52 | ↓ |
| 53 | ↓ |

APPENDIX-continued

| Pin | Description |
|---|---|
| 54 | ↓ |
| 55 | ↓ |
| 56 | ↓ |
| 57 | ↓ |
| 58 | ↓ |
| 59 | ↓ |
| 60 | ↓ |
| 61 | ↓ |
| 62 | ↓ |
| 63 | ↓ |
| 64 | ↓ |
| 65 | Unused |
| 66 | ↓ |
| 67 | ↓ |
| 68 | ↓ |
| 69 | ↓ |
| 70 | ↓ |
| 71 | ↓ |
| 72 | ↓ |
| 73 | ↓ |
| 74 | ↓ |
| 75 | ↓ |
| 76 | ↓ |
| 77 | ↓ |
| 78 | ↓ |
| 79 | ↓ |
| 80 | ↓ |
| 81 | ↓ |
| 82 | ↓ |
| 83 | ↓ |
| 84 | ↓ |
| 85 | ↓ |
| 86 | ↓ |
| 87 | ↓ |
| 88 | ↓ |
| 89 | ↓ |
| 90 | ↓ |
| 91 | ↓ |
| 92 | ↓ |
| 93 | ↓ |
| 94 | ↓ |
| 95 | ↓ |
| 96 | ↓ |

What is claimed is:

1. A system for testing industrial control modules having at least one input, the system comprising:
    a tester interface panel;
    an input stimulus device coupled to the tester interface panel, the input stimulus device adapted to provide at least one input stimulus signal; and
    at least one relay including a normally open contact, a common contact, and a normally closed contact coupled to the tester interface panel wherein the at least one relay is configurable to couple the at least one input stimulus signal to the at least one input.

2. The system of claim 1, the at least one relay comprising a plurality of relays and the at least one input comprising a plurality of inputs wherein any of the relays are configurable to be coupled to any of the plurality of inputs.

3. The system of claim 1, wherein any two of relay contacts selected from the group consisting of the open contact, the common contact and the normally closed contact are configurable to be coupled to the at least one input.

4. The system of claim 1, further comprising a communication device coupled to the tester interface panel, the communication device being adapted to provide a communication link between the system and an industrial control module.

5. The system of claim 1, further comprising a test fixture having a test fixture interface portion adapted to mate to the tester interface panel and a test fixture wiring portion adapted to provide configurability to the at least one relay.

6. The system of claim 5, wherein a portion of the test fixture wiring is coupled to a personality module wherein the test fixture is adapted to mechanically and electrically connect to a family of control modules and the personality module is adapted to provide electrical connections for different control module types of the family of control modules.

7. The system of claim 1, the at least one relay being controlled by an industrial output control module, the industrial output control module providing switching of the at least one relay between a normally closed state and a normally open state.

8. The system of claim 1, further comprising a data acquisition system coupled to the tester interface panel, the data acquisition system being adapted to measure the voltage level of the at least one input stimulus signal.

9. The system of claim 1, the at least one relay being releasably engageable in a socket.

10. A system for testing industrial control modules having at least one output signal, the system comprising:
   a tester interface panel;
   a measurement instrument coupled to the tester interface panel, the measurement instrument being adapted to measure the at least one output signal;
   an electronic load device;
   at least one power relay including a normally open contact, a common contact, and a normally closed contact coupled to the tester interface panel; and
   at least one analog relay including a normally open contact, a common contact, and a normally closed contact coupled to the tester interface panel wherein the at least one power relay is configurable to couple the load to the at least one output signal and the at least one analog relay is configurable to couple the measurement instrument to the at least one output signal.

11. The system of claim 10, the at least one analog relay comprising a plurality of analog relays and the at least one output comprising a plurality of outputs wherein any of the analog relays are configurable to be coupled to any of the plurality of outputs.

12. The system of claim 10, wherein any two relay contacts selected from the group consisting of the open contact, the common contact and the normally closed contact of the at least one analog relay are configurable to be coupled to the at least one input.

13. The system of claim 10, the at least one power relay comprising a plurality of power relays and the at least one output comprising a plurality of outputs wherein any of the power relays are configurable to couple the electronic load to any of the plurality of outputs.

14. The system of claim 10, wherein any two relay contacts selected from the group consisting of the open contact, the common contact and the normally closed contact of the at least one power relay are configurable to couple the load to the at least one output.

15. The system of claim 10, further comprising a communication device coupled to the tester interface panel, the communication device being adapted to provide a communication link between the system and an industrial control module.

16. The system of claim 10, further comprising a test fixture having a test fixture interface portion adapted to mate to the tester interface panel and a test fixture wiring portion adapted to provide configurability to the at least one relay.

17. The system of claim 16, wherein a portion of the test fixture wiring is coupled to a personality module, the test fixture being adapted to mechanically and electrically connect to a family of control modules and the personality module being adapted to provide electrical connections for different control module types of the family of control modules.

18. The system of claim 10, the at least one analog relay and the at least one power relay being controlled by at least one industrial output control module, the at least one industrial output control module providing switching of the at least one analog relay and the at least one power relay between a normally closed state and a normally open state.

19. The system of claim 10, the at least one analog relay and the at least one power relay being releasably engageable in a socket.

20. The system of claim 19, the at least one analog relay and the at least one power relay being of the same relay type.

21. A system for testing industrial control nodules having at least one of a plurality of inputs and a plurality of outputs, the system comprising:
   a tester interface panel;
   an input stimulus device coupled to the tester interface panel, the input stimulus device adapted to provide a plurality of input stimulus signals;
   an electronic load coupled to the tester interface panel;
   a measurement instrument coupled to the tester interface panel, the measurement instrument being adapted to measure the at least one of a plurality of inputs and a plurality of outputs;
   a plurality of power relays each including a normally open contact, a common contact, and a normally closed contact coupled to the tester interface panel; and
   a plurality of analog relays each including a normally open contact, a common contact, and a normally closed contact coupled to the tester interface panel wherein any of the plurality of power relays are configurable to couple one of the electronic load and any of the plurality of input stimulus signals to any of the at least one of a plurality of inputs and a plurality of outputs and any of the plurality of analog relays are configurable to couple the measurement instrument to any of the at least one of a plurality of inputs and a plurality of outputs.

22. The system of claim 21, further comprising a communication device coupled to the tester interface panel, the communication device being adapted to provide a communication link between the system and an industrial control module that is being tested.

23. The system of claim 21, further comprising a test fixture having a test fixture interface portion adapted to mate to the tester interface panel and a test fixture wiring portion adapted to provide configurability to at least one of the plurality of analog relays and the plurality of power relays.

24. The system of claim 23, wherein a portion of the test fixture wiring is coupled to a personality module, the test fixture being adapted to mechanically and electrically connect to a family of control modules and the personality module being adapted to provide electrical connections for different control module types of the family of control modules.

25. The system of claim 21, the plurality of analog relays and the plurality of power relays being controlled by at least one industrial output control module, the at least one industrial output control module providing switching of the plurality of analog relays and the plurality of power relays between a normally closed state and a normally open state.

26. The system of claim 21, wherein each of the plurality of analog relays and the plurality of power relays are releasably engageable in a socket.

27. The system of claim 26, the plurality of analog relays and the plurality of power relays being of the same relay type.

28. A method for testing industrial control modules having at least one of an input and an output, the method comprising the steps of:

providing a tester interface panel;

coupling input stimulus signals, output stimulus signals, measurement instrument lines and relay contacts to the tester interface panel, the relay contacts including a normally open contact, a common contact, and a normally closed contact for each relay coupled to the tester interface panel;

configuring at least one relay of the each relay coupled to the tester interface panel so that at least one of the input stimulus signals, output stimulus signals and measurement instrument lines are coupleable to the at least one of an input and an output; and providing a control system for moving the at least one relay between a normally closed state and a normally open state for coupling the at least one of the input stimulus signals, output stimulus signals and measurement instrument lines to the at least one of an input and an output.

29. The method of claim 28, the step of coupling input stimulus signals, output stimulus signals, measurement instrument lines and relay contacts to the tester interface panel further comprising coupling communication lines to the tester interface panel for providing a communication link between a test system and a control module that is being tested.

30. The method of claim 29, the step of configuring at least one relay of the each relay coupled to the tester interface panel, so that at least one of the input stimulus signals, output stimulus signals and measurement instrument lines are coupleable to the at least one of an input and an output comprising wiring the at least one relay to the at least one of the input stimulus signals, output stimulus signals and measurement instrument lines and wiring the at least one relay to the at least one of an input and an output.

31. The method of claim 28, further comprising wiring a first portion of the tester interface panel to electrically connect to a family of control modules and wiring to a second portion of the test fixture interface panel to electrical connect to different control module types of the family of control modules.

32. A system for testing industrial control modules having at least one of an input and an output, the system comprising:

means for providing accessibility to input stimulus signals, output stimulus signals, measurement instrument lines and relay contacts, the relay contacts including a normally open contact, a common contact, and a normally closed contact for each relay;

means for configuring at least one relay of the each relay, so that at least one of the input stimulus signals, output stimulus signals and measurement instrument lines are coupleable to the at least one of an input and an output; and means for moving the at least one relay between a normally closed state and a normally open state for coupling the at least one of the input stimulus signals, output stimulus signals and measurement instrument lines to the at least one of an input and an output.

33. The system of claim 32, further comprising means for communicating between the system and a control module that is being tested.

34. The system of claim 32, further comprising means for interfacing to a family of control modules and means for interfacing to different control module types of the family of control modules.

* * * * *